United States Patent [19]

Jentsch

[11] Patent Number: 4,999,872

[45] Date of Patent: Mar. 19, 1991

[54] DOOR CLOSER

[75] Inventor: Dietrich Jentsch, Ennepetal, Fed. Rep. of Germany

[73] Assignee: Dorma GmbH & Co. KG, Ennepetal, Fed. Rep. of Germany

[21] Appl. No.: 473,902

[22] Filed: Feb. 2, 1990

Related U.S. Application Data

[63] Continuation-in-part of Ser. No. 272,122, Nov. 16, 1988, Pat. No. 4,937,913.

[30] Foreign Application Priority Data

Mar. 3, 1989 [DE] Fed. Rep. of Germany ....... 3742213
Mar. 15, 1989 [DE] Fed. Rep. of Germany ....... 3908340

[51] Int. Cl.[5] .......... F16F 9/48

[52] U.S. Cl. .......... 16/58; 16/62; 16/DIG. 9; 16/DIG. 21; 188/316

[58] Field of Search .......... 16/58, DIG. 9, DIG. 21, 16/64, 62; 188/316, 286, 317

[56] References Cited

U.S. PATENT DOCUMENTS

| | | | |
|---|---|---|---|
| 2,714,429 | 8/1955 | Eatherton | 188/317 |
| 3,487,494 | 1/1970 | Baan | 16/51 |
| 4,064,977 | 12/1977 | Taylor | 188/317 |
| 4,166,522 | 9/1979 | Bourcier de Carbon | 188/317 |
| 4,349,939 | 9/1982 | Tillman | 16/58 |
| 4,660,250 | 4/1987 | Tillmann | 16/58 |
| 4,665,583 | 5/1987 | Frolou et al. | 16/58 |

*Primary Examiner*—Richard K. Seidel
*Assistant Examiner*—Edward A. Brown
*Attorney, Agent, or Firm*—Peter K. Kontler

[57] ABSTRACT

A door closer wherein a housing defines a fluid-containing space for a reciprocable damping piston which divides the space into a first and a second compartment. The piston carries a check valve which is closed during movement of the piston in a first direction while the door panel is being opened and which is open when the piston moves in the opposite direction. A channel is provided in the housing to permit fluid to flow from the first compartment into the second compartment during a first stage of movement of the piston in the first direction. The check valve has a body which defines a passage for the flow of fluid between the compartments and is surrounded by a seat having one or more grooves which are only partially overlapped by a spherical or non-spherical valving element during movement of the piston in the first direction to thus establish a relatively small path for the flow of fluid between the compartments, at least during a second stage of movement of the piston in the first direction, such second stage following the first stage. Springs in that compartment from which fluid is expelled during movement of the piston in the first direction oppose such movement of the piston, and an additional spring can be provided to bias the valving element against its seat.

13 Claims, 1 Drawing Sheet

DOOR CLOSER

CROSS-REFERENCE TO RELATED APPLICATION

This is a continuation-in-part of the commonly owned copending patent application Ser. No. 07/272,122 filed Nov. 16, 1988 for "Door Closer", now U.S. Pat. No. 4,937,913 granted July 3, 1990.

BACKGROUND OF THE INVENTION

The invention relates to improvements in apparatus for controlling the movement of a door panel or an analogous (normally pivotable) component between first and second positions, especially between closed and open positions. More particularly, the invention relates to improvements in door closers of the type disclosed in the commonly owned U.S. Pat. No. 4,937,913.

The copending patent application describes and shows a door closer wherein an elongated housing confines a reciprocable damping piston which divides the internal space of the housing into a first and a second compartment. The first compartment contains one or more springs which bias the piston to a position corresponding to the closed position of the door panel. The internal space of the housing is filled with a fluid, and the housing has a channel which establishes a path for the flow of fluid from the first compartment into the second compartment when the door panel is pivoted from open position. The arrangement is such that the flow of fluid by way of the channel is reduced or interrupted when the piston reaches a certain axial position, i.e., when the door panel has completed a predetermined angular movement from closed position. In order to permit further pivoting of the door panel toward fully open position, the piston and/or a check valve therein defines at least one bypass which establishes a relatively small path for the flow of fluid from the first compartment into the second compartment during that stage of pivotal movement of the door panel from closed position when the channel is already sealed or the rate of flow of fluid through the channel is greatly reduced. The purpose of the check valve is to permit the fluid to flow from the second compartment back into the first compartment while the spring or springs in the first compartment are free to dissipate energy and to pivot the door panel back to closed position. The connection between the piston and the door panel includes a shaft which is rotatably mounted in the housing, a rack and pinion drive between the shaft and the piston, and one or more levers, arms or other motion transmitting parts between the shaft and the door panel. The cross-sectional area of the bypass between the two compartments increases in a direction from the first compartment toward the second compartment. This is intended to prevent excessive rise of fluid pressure at the inlet of the bypass. The copending patent application discloses the possibility of providing the bypass in the peripheral surface of the piston or in the peripheral surface of the body of the check valve.

The door closer which is disclosed in the copending patent application operates quite satisfactorily as long as the fluid which is confined in the housing is free of solid impurities. However, the damping action is likely to be changed as soon as a solid impurity penetrates into and remains lodged in the bypass. Moreover, once the bypass is partially or completely blocked, the likelihood that the entrapped impurity or impurities would be flushed out by the fluid is very remote. Still further, the dimensions of the bypass must be selected with a very high degree of precision irrespective of whether the bypass is provided in the peripheral surface of the piston or in the peripheral surface of the body of the check valve which is installed in the piston. The impurities in the confined fluid can constitute particles of material which was removed from the housing, from the piston and/or from the check valve during manufacturing of the respective parts. Still further, the cross-sectional area of the bypass is likely to change during installation of the check valve in the piston and/or during installation of the piston in the housing.

OBJECTS OF THE INVENTION

An object of the invention is to provide a novel and improved door closer wherein the rate of fluid flow between the compartments in the housing can be regulated with a higher degree of accuracy than in heretofore known apparatus.

Another object of the invention is to provide an apparatus for use in the above outlined door closer wherein manufacturing tolerances of the damping piston and/or its check valve cannot affect or cannot unduly affect the rate of fluid flow between the compartments of the fluid-filled housing for the piston.

A further object of the invention is to provide a self-cleaning check valve for use in the above outlined apparatus.

An additional object of the invention is to provide an apparatus wherein the check valve or valves alone determine the rate of fluid flow during certain critical stages of pivotal movement of a door panel or another pivotable component between open and closed positions.

Still another object of the invention is to provide a novel and improved valve body for use in the above outlined check valve.

A further object of the invention is to provide a novel and improved method of preventing clogging of the bypass or bypasses between the compartments in the housing of the above outlined apparatus.

SUMMARY OF THE INVENTION

The invention is embodied in an apparatus for controlling movements of a door panel or an analogous component between open and closed positions. The improved apparatus comprises a preferably elongated housing having a fluid-containing space, and a damping piston which is installed in the housing for movement in a first direction during movement of the component from one of its positions and in a second direction counter to the first direction during movement of the component toward the one position. The piston divides the space into first and second compartments and is arranged to expel fluid from the first compartment during movement in the first direction. In order to enable the piston to expel fluid from the first compartment, the housing is provided with channel means defining a first path for the flow of fluid from the first compartment into the second compartment, and the piston is provided with a check valve which enables the fluid to flow from the second compartment back into the first compartment during movement of the piston in the second direction. The valve includes a body having a passage for the flow of fluid between the compartments and a seat which surrounds a portion of the passage. The valve further comprises a valving element which abuts the seat during movement of the piston in the first direction, and the body of the valve defines a bypass which is provided, at least in part, in the seat and defines a relatively small second path for the flow of fluid between the compartments during movement of the piston in the first direction. The arrangement is or can be such that the channel establishes a relatively large first path for the flow of fluid from the first into the second compartment during a first stage of movement of the piston in the first direction, and that the bypass establishes a smaller path for the flow of fluid from the first into the second compartment at least during the next-following second stage of movement of the piston in the first direction (the piston can be caused to move in the first direction during movement of the component toward the open position).

The bypass has a first end at the seat and a second end between the seat and the second compartment. The valving element preferably overlies a portion of the first end of the bypass while the valving element abuts the seat. Otherwise stated, the valving element preferably obstructs the flow of fluid through a portion of the bypass while it abuts the seat.

The bypass can comprise at least one groove which is machined into or is otherwise formed in the valve body at the seat. In accordance with a presently preferred embodiment, the bypass comprises a plurality of (e.g., three) grooves. If the seat in the valve body is an annular seat, the grooves of the bypass are preferably at least substantially equidistant from each other in the circumferential direction of the seat.

The valve body can include an extension (e.g., a cage) which defines a chamber for the valving element. For example, the body of the valve can include a larger-diameter cylindrical or nearly cylindrical portion which defines the passage, and a smaller-diameter portion which constitutes or includes the extension. The passage extends between the chamber and the second compartment, and the body of the valve can be provided with at least one port (e.g., a substantially radially extending bore or hole) which connects the chamber with the first compartment.

The valve can further comprise means for biasing the valving element against the seat with a force which does not suffice to prevent movement of the valving element away from the seat when the piston is caused to move in the second direction to expel fluid from the second compartment.

The valving element can constitute a sphere which can engage a concave seat. Alternatively, the valving element can be provided with a substantially flat surface which abuts a flat seat while the piston moves in the first direction.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figures 1, 2, 3, 4, 5:
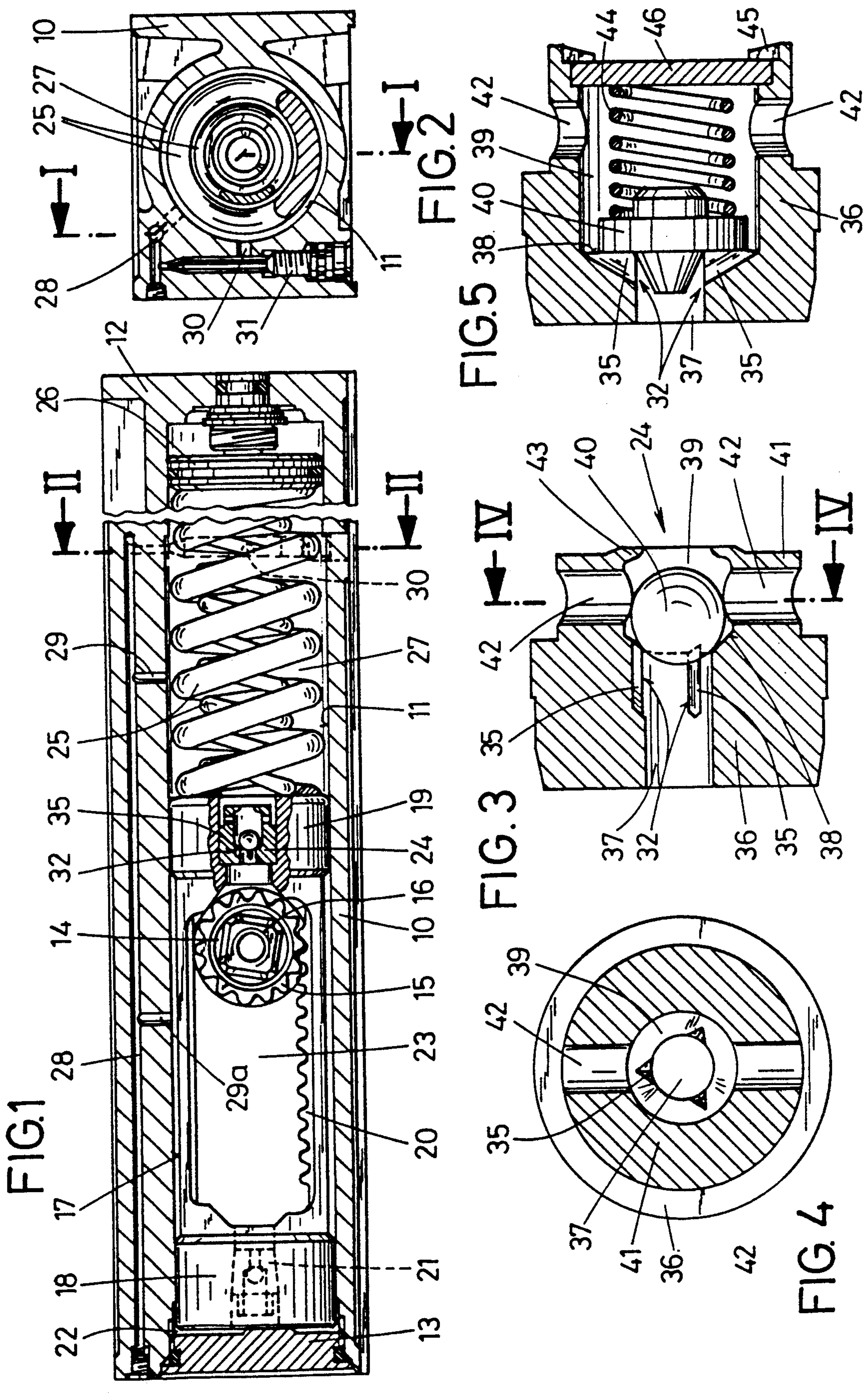
FIG. 1 is a fragmentary longitudinal sectional view of an apparatus which can be used to control the movements of a door panel and embodies one form of the invention, the section being taken in the direction of arrows as seen from the line I—I in FIG. 2.
FIG. 2 is a transverse sectional view substantially as seen in the direction of arrows from the line II—II in FIG. 1.
FIG. 3 is an enlarged axial sectional view of one check valve in the damping piston of the apparatus which is shown in FIGS. 1 and 2.
FIG. 4 is a sectional view substantially as seen in the direction of arrows from the line IV—IV of FIG. 3.
FIG. 5 is an axial sectional view of a modified check valve which can be utilized in lieu of the check valve of FIGS. 3 and 4.

FIGS. 1 and 2 show an apparatus which can control the movements of a pivotable component (e.g., a door panel) between open and closed positions. Reference may be had, for example, to commonly owned U.S. Pat. No. 4,660,250 granted Apr. 28, 1987 to Tillman et al for "Door Closer" which shows how a somewhat different apparatus can control the movements of a door panel between open and closed positions.

The apparatus which is shown in FIGS. 1 and 2 comprises an elongated housing 10 defining an elongated fluid-filled space 11 (e.g., a cylindrical bore or hole which is drilled into or is otherwise formed in the housing 10). One end of the space 11 is closed and sealed by an end wall 12 which is an integral part of the housing 10, and the other end of this space is sealed and closed by a detachable externally threaded plug 13. The elongated tubular wall of the housing 10 is provided with two aligned transversely extending stepped bores or holes (not shown) for suitable bearings and sealing elements which surround a rotary member 14 (e.g., a shaft) which can transmit motion to or can receive motion from the pivotable component. That portion of the rotary member 14 which extends across the space 11 in the housing 10 carries a gear 15 (e.g., a relatively small pinion) mating with an elongated toothed rack 20 constituting an intermediate portion of a damping piston 17 in the space 11. The housing 10 is or can be mounted on a door frame, and that portion of the rotary member 14 which extends from the housing 10 carries an arm which forms part of or constitutes an operative connection between the piston 17 and the pivotable component (such as the aforementioned door panel). To this end, at least one end portion of the rotary member 14 constitutes a polygonal stub 16 which is receivable in a complementary non-circular socket of the arm.

The damping piston 17 further comprises a first enlarged end portion or head 18 which divides the space 11 into a compartment 23 and a compartment 22. A check valve 21 in the head 18 opens to permit the fluid to flow from the compartment 23 into the compartment 22 when the piston 17 is caused to move in a direction to the right (as seen in FIG. 1), namely in a direction corresponding to pivotal movement of a door panel to toward its open position.

A second enlarged end portion or head 19 of the damping piston 17 is disposed between the compartment 23 and a further compartment 27 of the space 11. The head 18 damps the movement of the door panel toward closed position and the head 19 damps the movement of the door panel toward open position. The toothed rack 20 constitutes an elongated rib or web which connects the heads 18 and 19 with each other and is located in the compartment 23. When the piston 17 is caused to move in the space 11 by one or more coil springs 25 in the compartment 27, it transmits torque to the rotary member 14 which, in turn, pivots the door panel toward closed position. The door panel can be pivoted by hand or otherwise to induce a longitudinal movement of the piston 17 in the space 11 of the housing 10 in a direction to stress the springs 25.

The check valve 21 in the head 18 of the piston 17 closes automatically when the pressure in the compartment 22 adjacent the plug 13 rises in response to leftward movement of the piston 17 (as seen in FIG. 1). The compartment 21 is connected or is connectable with the compartment 23 in a conventional manner, e.g., as described and shown in the aforementioned commonly owned U.S. Pat. No. 4,660,250 to Tillman et al. The connection between the compartments 22, 23 preferably contains a throttle valve which damps the movement of the door panel toward closed position. Such throttle valve can be installed in that portion or branch of the connection between the compartments 22, 23 which is adjacent the plug 13.

The compartment 27 between the head 19 of the damping piston 17 and the end wall 12 contains the aforementioned coil springs 25 which bias the piston in a direction toward the plug 13, i.e., in a direction to pivot the door panel toward closed position. FIG. 1 shows the piston 17 in that axial position in which the door panel is closed. The right-hand end convolutions of the coil springs 25 abut and react against an axially adjustable retainer 26 which is installed in the space 11 adjacent the end wall 12. If the retainer 26 seals the respective portion of the space 11, the compartment 27 extends between this retainer and the head 19 of the piston 17.

The housing 10 defines an elongated channel 28 with ports 29, 29*a*, 30 to establish a first path for the flow of the fluid (e.g., oil) which fills the space 11 from the compartment 27 into the compartment 23 when the piston 17 is caused to move toward the end wall 12, i.e., in a direction corresponding to pivoting of the door panel toward open position. The port 29*a* establishes permanent communication between the channel 28 and the compartment 23. The port 29 is sealed by the head 19 of the piston 17 after the piston completes a first stage of movement in a direction toward the end wall 12, e.g., when the door panel has been pivoted (from closed position) through an angle of, for example, 70 degrees.

The port 30 communicates with the channel 28 close to the end wall 12 of the housing 10, namely at such a distance from the plug 13 that it cannot be sealed by the head 19 of the piston 17 irrespective of the angular position of the door panel, i.e., not even in the fully open position of the door panel. Communication between the port 30 and the channel 28 is established by way of a throttle valve 31 (FIG. 2) which can be adjusted to completely seal the path for the flow of fluid between the compartment 27 and the channel 28 via port 30 to thus enhance the damping action of the piston 17 as soon as the head 19 reaches and seals the port 29. Thus, if the throttle valve 31 is set to only partially block the flow of fluid between the port 30 (which is in permanent communication with the compartment 27 adjacent the end wall 12) and the channel 28, the damping action of the piston 17 will be less pronounced during pivoting of the door panel from closed position toward that angular position in which the head 19 of the piston 17 reaches and seals the port 29, and more pronounced if the door panel continues to pivot toward its fully open position. On the other hand, if the throttle valve 31 is closed (or if this valve is omitted, together with the port 30), the channel 28 ceases to establish a path for the flow of fluid from the compartment 27 into the compartment 23 as soon as the head 19 of the piston 17 reaches and seals the port 29.

A check valve 24 in the head 19 of the piston 17 closes in response to movement of the piston from the illustrated position in a direction toward the end wall 12. On the other hand, the valve 24 opens in automatic response to return movement of the piston 17 toward the illustrated left-hand end position to thus establish a direct path for the flow of fluid between the compartments 23 and 27.

The details of the check valve 24 are shown in FIGS. 3 and 4. This valve includes a body 36 having a larger-diameter portion which is sealingly installed in a central bore or hole of the head 19, and a smaller-diameter extension or cage 41 which defines a chamber 39 for a spherical valving element 40. The larger-diameter portion of the body 36 defines an axial passage 37 which connects the chamber 39 with the compartment 23, and the extension 41 has one or more radially extending bores or ports 42 which establish communication between the chamber 39 and the compartment 27. The body 36 further defines a somewhat concave annular seat 38 at the right-hand axial end of the passage 37 (as seen in FIG. 1 or FIG. 3). The valving element 40 abuts the seat 38 and thus substantially seals the major portion of the passage 37 from the chamber 39 when the pressure in the compartment 27 exceeds the pressure in the compartment 23, i.e., while the piston 17 moves toward the end wall 12. The flow through the passage 37 is not completely interrupted when the valving element 40 abuts the seat 38 because the body 36 is provided with a bypass 32 including at least one but preferably several (e.g., three) equidistant grooves or notches 35 which are machined into the surface bounding the passage 37 and have open ends at the seat 38. The valving element 40 cannot completely seal the adjacent ends of the grooves 35, even when it abuts the seat 38. In this manner, the bypass 32 establishes a relatively small path for the flow of fluid from the compartment 27 (actually from the chamber 39) into the compartment 23 (actually into the major portion of the passage 37) to thereby ensure that the piston 17 can move toward the end wall 12 even if the throttle valve 31 is closed or omitted (together with the port 30) and even after the head 19 of the piston 17 reaches and seals the port 29. Each of the illustrated grooves 35 has a substantially triangular cross-sectional outline, and each of these grooves establishes a permanent communication between the major part of the passage 37 and the chamber 39 in the valve body 36.

The seat 38 of the valve body 36 constitutes a shoulder in the surface which bounds the passage 37. The chamber 39 can constitute an enlarged end portion of the passage 37, and the extension or cage 41 includes one or more lips or stops 43 which prevent expulsion or escape of the valving element 40 from the chamber 39.

The configuration of the groove or grooves 35 forming part of the bypass 32 can depart from that of the three grooves which are shown in FIGS. 3 and 4. For example, each such groove can have a substantially rectangular or trapezoidal cross-sectional outline.

The configuration of the seat 38 and the diameter of the spherical valving element 40 can be such that the rate of flow of fluid through the grooves 35 in closed position of the check valve 24 is only a small fraction of the rate of flow through the grooves in open position of the check valve, e.g., when the valving element 40 abuts the lip or lips 43. This is desirable and advantageous because any solid impurities which happen to penetrate into one or more grooves 35 of the bypass 32 are readily flushed out when the check valve 24 is open, i.e., when this valve permits pronounced flow of fluid from the compartment 23 into the compartment 27 during movement of the door panel back to its closed position.

It can be said that the effective cross-sectional area of the bypass 32 increases in a direction from the compartment 27 toward the compartment 23 even if the cross-sectional area of each of its grooves 35 is constant all the way from one end to the other, i.e., from the chamber 39 to the passage 37. The reason is that those ends of the grooves 35 which are adjacent the seat 38 are at least slightly or substantially overlapped by the valving element 40 as soon as the check valve 24 is closed as a result of movement of the piston 17 from the end position of FIG. 1 toward the end wall 12. The provision of grooves 35 having a constant cross-sectional area from end to end simplifies the making of the valve body 36 and contributes to a reduction of the cost of the improved apparatus.

The operation of the apparatus which is shown in FIGS. 1 to 4 is as follows:

FIG. 1 shows the damping piston 17 in the left-hand end position in which the volume of the compartment 22 has been reduced to a minimum and the door panel is closed. If a person or a vehicle pivots the door panel from the closed position, the rotary member 14 is caused to turn in a direction to induce the rack and pinion drive 20, 15 to move the piston 17 away from the plug 13. This results in a reduction of the volume of the compartment 27 and in expulsion of fluid from this compartment into the compartment 23 by way of the port 29, channel 28 and port 29*a*. At such time, the piston 17 offers a first resistance to pivoting of the door panel toward open position. The piston 17 moves against the opposition of the springs 25 in the compartment 27, i.e., the force acting upon the door panel to pivot it from closed position must suffice to cause the springs 25 to store energy and to overcome the resistance which the fluid encounters during flow from the compartment 27, through the port 29, channel 28, port 29*a* and into the compartment 23.

When the door panel completes a certain pivotal movement (e.g., through an angle of approximately 70 degrees) from the closed position, the head 19 of the piston 17 reaches and seals the port 29. At such time, further pivoting of the door panel toward open position necessitates the exertion of a greater force, especially if the throttle valve 31 is closed or is omitted with the port 30, i.e., if the flow of fluid from the compartment 27 into the compartment 23 via channel 28 is terminated as soon as the head 19 of the piston 17 seals the port 29. The only path for the flow of fluid from the compartment 27 is then through the bypass 32, and such flow is throttled by the valving element 40 which at such time abuts the seat 38 and partially blocks the flow of fluid into those ends of the grooves 35 which are located at the seat 38, i.e., which communicate with the chamber 39.

The resistance which the bypass 32 offers to the flow of fluid from the chamber 39 into the passage 37 while the valve 24 is closed is relatively small if the door panel is pivoted rather slowly toward the fully open position. In other words, if the speed at which the door panel is pivoted beyond an angle of approximately 70 degrees is relatively low, the magnitude of the force which is required to pivot the door panel need not be appreciably increased beyond that during pivoting of the door panel through the first 70 degrees. However, if a person attempts to rapidly pivot the door panel beyond the angle of approximately 70 degrees, i.e., beyond that angle at which the head 19 of the piston 17 seals the port 29, the fluid which is to leave the compartment 27 by way of the bypass 32 encounters a greater resistance and the force acting upon the door panel to rapidly pivot the latter toward the fully open position must be increased accordingly. It has been found that the resistance which is encountered by the fluid flowing through the bypass 32 while the check valve 24 is closed can be readily selected in such a way that the door panel comes to a halt at a predetermined angle from the closed position irrespective of the speed at which the door panel has been pivoted from the closed position. Thus, the door panel nearly invariably comes to a halt in a given angular position irrespective of the magnitude of force which was applied thereto in order to pivot it away from the closed position.

Once the application of a force to the door panel in a direction to move it away from closed position is terminated or reduced below a predetermined threshold value, the springs 25 in the compartment 27 are free to dissipate energy and to push the piston 17 back toward the position of FIG. 1. This results in opening of the check valve 24 and in the establishment of pronounced flow of fluid from the compartment 23 into the compartment 27. At the same time, the compartment 23 receives fluid from the compartment 22 by way of the aforediscussed throttle valve which determines the damping action of the piston 17 during pivoting of the door panel back toward closed position.

FIG. 5 shows a modified check valve which can be used in lieu of the valve 24 of FIGS. 3 and 4. The difference is that the slightly concave seat 38 of FIG. 3 is replaced with a flat seat 38 for the adjacent flat surface of a modified valving element 40 having a cylindrical portion or collar abutting the seat 38 when the valve is closed, and a frustoconical portion which then extends into the passage 37. The bypass 32 of the valve which is shown in FIG. 5 includes at least two notches or grooves 35 which terminate in the seat 38 and extend radially inwardly toward the passage 37. The effective cross-sectional area of the bypass 32 including the grooves 35 of FIG. 5 increases in a direction from the chamber 39 for the valving element 40 toward the passage 37 (i.e., toward the compartment 23), at least when the check valve of FIG. 5 is closed, i.e., when the flat surface of the cylindrical portion or collar of the valving element 40 abuts the flat seat 38 between the passage 37 and the chamber 39. The valving element 40 of FIG. 5 is biased toward the seat 38 by a relatively weak coil spring 44 which abuts against a plate-like retainer 46 in the smaller-diameter extension of the valve body 36. The extension is again provided with transversely extending bores or ports 42 which establish communication between the chamber 39 and the compartment 27. The retainer 46 is held in the illustrated position by one or more claws 45 of the extension. The claws 45 can be obtained in response to upsetting of a portion of the extension of the valve body 36 subsequent to insertion of the retainer 46. The spring 44 is sufficiently weak to readily yield when the piston including the check valve of FIG. 5 is caused to move in a direction toward the plug 13, i.e., in a direction to damp the pivotal movement of the door panel toward its closed position.

The improved apparatus is susceptible of many additional modifications without departing from the spirit of the invention. For example, the apparatus can be provided with the illustrated bypass 32 which is effective during a certain stage of pivotal movement of the door panel or another pivotable component from closed toward open position, and with a second bypass which is effective during pivoting of the door panel back toward closed position. Such twin bypasses can be used with advantage in door closers which are provided with means for preventing a delay in closing of the door panel (e.g., while the door panel is maintained at an angle of between 120 and 70 degrees from the closed position beyond a given interval. For example, a time delay feature can be embodied in a door closer in order to reduce the danger of spreading of fire. Such door closers are or can be equipped with time delay mechanisms which ensure that the interval for closing of the door panel cannot exceed a given interval, e.g., 30 seconds.

Presently known valves which are used to regulate the speed at which the door panel is closed are not entirely satisfactory because the relatively small paths which are established by such valves are likely to be clogged by impurities in the fluid filling the housing of the door closer. Moreover, the accuracy of adjustment of such valves is not entirely satisfactory. The improved check valve does not exhibit such drawbacks because any impurities which gather in the groove or grooves 35 of the bypass 32 are readily and reliably flushed out of the grooves when the check valve is open, i.e., when the valving element 40 is spaced apart from its seat 38 to permit the flow of a large quantity of fluid between the passage 37 and the chamber 39.

If a check valve of the type shown in FIGS. 3-4 or in FIG. 5 is used to determine the duration of closing of the door panel, the selected interval for closing remains unchanged for any desired period of time because the grooves 35 are automatically cleaned when the valve is open. Thus, all that is necessary is to properly select the combined cross-sectional area of the grooves 35 and the extent to which the flow through the grooves is obstructed by the valving element 40 in closed position of the check valve.

The bypass 32 can include a single groove 35. Several grooves are preferred at this time because this further reduces the likelihood of complete clogging of the bypass by simultaneous lodging of impurities in each of several grooves.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for controlling movements of a door panel or a like component between open and closed positions, comprising a housing having a fluid-containing space; a damping piston installed in said housing for movement in a first direction during movement of the component from one of said positions and in a second direction during movement of the component toward said one position, said piston dividing said space into first and second compartments and said piston being arranged to expel fluid from said first compartment during movement in said first direction; channel means provided in said housing and defining a first path for the flow of fluid from said first compartment into said second compartment; and a valve provided in said piston to enable the fluid to flow from said second compartment into said first compartment during movement of the piston in said second direction, said valve including a body having a passage for the flow of fluid between said compartments and a seat surrounding a portion of said passage, and a valving element which abuts said seat during movement of said piston in said first direction, said body further having a bypass provided in said seat and defining a relatively small second path for the flow of fluid between said compartments during movement of said piston in said first direction.

2. The apparatus of claim 1, wherein said bypass comprises at least one groove in said body at said seat.

3. The apparatus of claim 1, wherein said bypass has a first end at said seat and a second end between said seat and said second compartment, said valving element overlying a portion of said first end while abutting said seat.

4. The apparatus of claim 1, wherein said valving element obstructs the flow of fluid through a portion of said bypass while abutting said seat.

5. The apparatus of claim 1, wherein said bypass comprises a plurality of grooves in said body at said seat.

6. The apparatus of claim 5, wherein said bypass comprises three grooves.

7. The apparatus of claim 5, wherein said body has a substantially annular seat and said grooves are substantially equidistant from each other in the circumferential direction of said seat.

8. The apparatus of claim 1, wherein said body has an extension defining a chamber for said valving element.

9. The apparatus of claim 8, wherein said body includes a larger-diameter portion which defines said passage and a smaller-diameter portion which includes or constitutes said extension.

10. The apparatus of claim 8, wherein said passage extends between said chamber and said second compartment, said body further having at least one port connecting said chamber with said first compartment.

11. The apparatus of claim 1, wherein said valve further comprises means for biasing said valving element against said seat.

12. The apparatus of claim 1, wherein said valving element is a sphere.

13. The apparatus of claim 1, wherein said valving element has a substantially flat surface abutting said seat during movement of said piston in said first direction.

* * * * *

UNITED STATES PATENT AND TRADEMARK OFFICE

CERTIFICATE OF CORRECTION

PATENT NO. : 4,999,872

DATED : March 19, 1991

INVENTOR(S) : Dietrich Jentsch

It is certified that error appears in the above-identified patent and that said Letters Patent is hereby corrected as shown below:

On the title page: ITEM [30] Foreign Priority Data: "Mar. 3, 1989" should read --Dec. 12, 1987--.

Col. 1, line 13, "movement" should read --movements --.

Signed and Sealed this

Twenty-second Day of June, 1993

*Attest:*

MICHAEL K. KIRK

*Attesting Officer*

*Acting Commissioner of Patents and Trademarks*